H. L AND H. E WARD.
LOW GEAR LOCK AND THEFT PREVENTING DEVICE FOR AUTOMOBILES.
APPLICATION FILED JAN. 26, 1921.
1,427,662.
Patented Aug. 29, 1922.
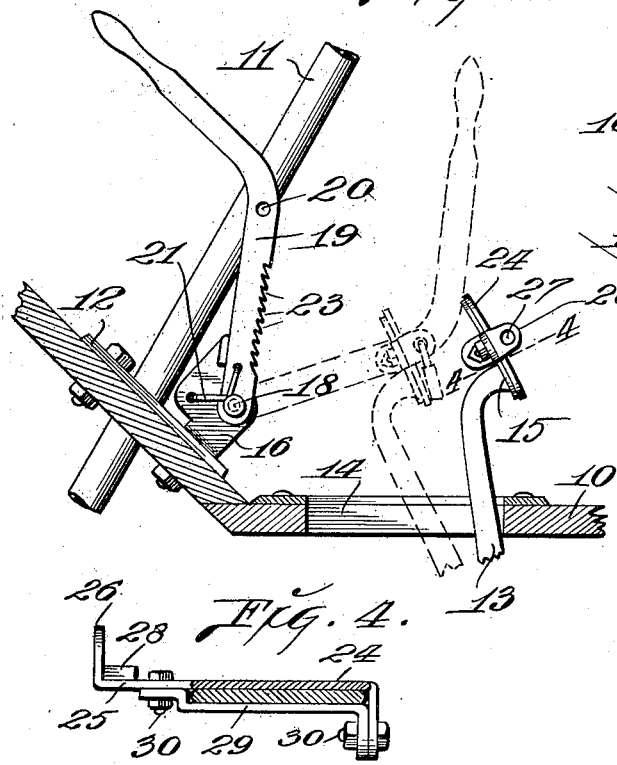
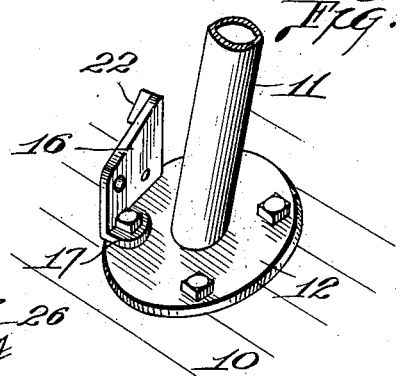
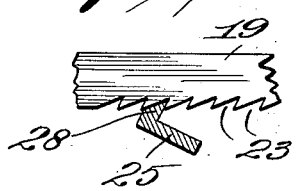
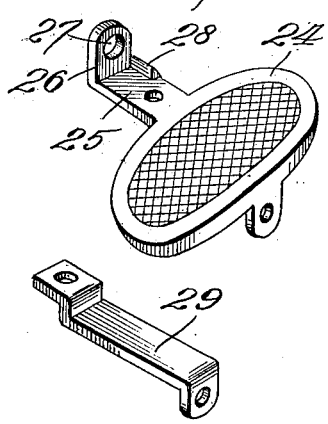
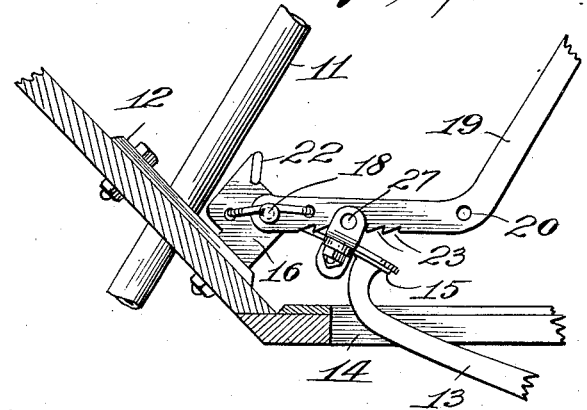
INVENTORS:—
Harry L. Ward, and
Harry E. Ward.
By Hazard & Miller
Attys.

UNITED STATES PATENT OFFICE.

HARRY L. WARD AND HARRY E. WARD, OF LONG BEACH, CALIFORNIA.

LOW-GEAR LOCK AND THEFT-PREVENTING DEVICE FOR AUTOMOBILES.

1,427,662.  Specification of Letters Patent.  Patented Aug. 29, 1922.

Application filed January 26, 1921. Serial No. 440,175.

*To all whom it may concern:*

Be it known that we, HARRY L. WARD and HARRY E. WARD, citizens of the United States, residing at Long Beach, in the county of Los Angeles and State of California, have invented new and useful Improvements in Low-Gear Lock and Theft-Preventing Devices for Automobiles, of which the following is a specification.

Our invention relates generally to attachments for automobiles, and more particularly to a device that is particularly applicable for use upon automobiles of the Ford make, and which device is designed for engaging and retaining the gear shift lever when the same is moved into "low speed" position, and said device also serving to lock the gear shift lever in neutral position, thereby preventing the unauthorized use and theft of the vehicle to which the device is applied.

The principal objects of our invention are to provide a relatively simple device that is capable of being easily and cheaply produced and which device occupies an "out of the way" position while not in use and being located so that it can be easily and quickly shifted into position to engage and retain the gear shift lever when the same is moved into low speed position, and further, to provide a device that may be easily and quickly locked to the gear shift lever by means of a padlock.

With the foregoing and other objects in view, our invention consists in certain novel features of construction and arrangement of parts that will be hereinafter more fully described and claimed and illustrated in the accompanying drawings, in which—

Fig. 1 is a sectional view of a portion of the floor and foot board of a Ford car showing our improved low gear lock and theft preventing device applied thereto.

Fig. 2 is a sectional view similar to Fig. 1 and showing our improved device in engagement with the gear shift lever and with the latter occupying its low gear or low speed position.

Fig. 3 is a perspective view of the floor board plate that serves as a bearing for the lower portion of the steering column and showing a portion of our device applied thereto.

Fig. 4 is an enlarged cross section taken approximately on the line 4—4 of Fig. 1.

Fig. 5 is a detail sectional view of the means employed for retaining the gear shift lever in "low" position.

Fig. 6 is a perspective view of the parts of our improved device that are applied to the pedal on the gear shift lever.

Referring by numerals to the accompanying drawings; 10 designates the flooring of the vehicle, 11 the steering column, 12 the plate that is positioned on the flooring and which serves as a bearing for the lower portion of the steering column, 13 the usual gear shift lever that operates through a slot 14 in the flooring and being provided at its upper end with a foot plate or pedal 15.

Our attachment includes a small upright bracket 16 in the form of a plate having an ear 17 that projects laterally from its lower portion, and said ear being perforated in order to receive one of the bolts that serve as attaching means for the plate 12, and thus said bracket is firmly secured to the plate 12 and flooring 10 at a point in front of the gear shift lever slot 14.

Fulcrumed on a pin or stud that projects outwardly from bracket 16 is the lower end of a hand lever 19 the upper portion of which is bent forwardly at an angle of approximately forty-five degrees with respect to the main body portion of said lever, and formed through said lever adjacent to the point where the same is bent is an aperture 20. The coiled central portion of a spring 21 is positioned on pin 18 and the ends of said spring being connected to bracket 16 and lever 19 so that the latter is normally maintained in its forward position as shown by solid lines in Fig. 1, and said lever being maintained in such position by its engagement with a stop lug 22 which latter is formed integral with and projects outwardly from bracket 16 at a point above and in front of pin or stud 18.

By virtue of the construction just described, lever 19 while not in use occupies an "out of the way" position beneath the dash of the vehicle and immediately to the left of the lower portion of the steering column 11. The lower edge of the lever 19 immediately above or to the rear of its fulcrumed point is provided with a series of notches 23, the same being undercut in order to interlock with an angular tooth or lug which will be hereinafter more fully described.

Adapted to be positioned on top of the foot plate or pedal 15 is a plate 24 from the side of which projects a short horizontally disposed arm 25 and the end portion of the latter being extended vertically upward as designated by 26 and this upwardly extended terminal portion is provided with an aperture 27.

Formed on top of the arm 25 adjacent to the upwardly projecting end portion 26 is an angular tooth or lug 28 that is adapted to interlock with the teeth between the notches 23 when the lever 19 is moved rearwardly and downwardly to retain the gear shift lever in "low speed" position.

Plate 24 is retained in position upon footplate or pedal 15 by a keeper 29 in the form of a metal strip or bar that is positioned beneath said footplate and its ends being secured to plate 24 and arm 25 in any suitable manner, preferably by means of bolts such as 30.

Under ordinary conditions, lever 19 occupies its forward "out of the way" position as illustrated by solid lines in Fig. 1, and when so positioned the gear shift lever 13 may be moved through the slot 14 to shift gears in the usual manner.

In the operation of automobiles, it very frequently happens that it is necessary to drive at low speed for a considerable time, for instance, when pulling extra heavy loads through relatively soft roadways or while ascending long grades, and under such conditions it is necessary for the operator of the car to shift lever 13 forwardly and downwardly into low gear position and to retain the lever in such position by continued foot pressure. This continued downward and forward pressure upon the gear shift lever requires considerable effort on the part of the driver, and with our improved device, the lever may be engaged and held in low speed position by merely swinging hand lever 19 rearwardly and downwardly after the gear shift lever has been shifted into low speed position and when these movements have been accomplished, the angular lug or tooth 28 on arm 25 will engage in one of the notches 23, the lever 19 thereby interlocking with one of the teeth between said notches, as illustrated in Fig. 5, with the result that the gear shift lever will be securely held in low speed position or in the position illustrated in Fig. 2. To release the restraining means, it is only necessary to move the gear shift lever downward a sufficient distance to disengage tooth 28 from the lever 19 and following this action, spring 21 will act to swing the hand lever upwardly and forwardly into its "out of the way" position.

To lock the gear shift lever in neutral position in order to prevent the unauthorized use or theft of the vehicle, said lever is shifted into neutral position as shown by dotted lines in Fig. 1, after which the hand lever is pulled rearwardly and downwardly until aperture 20 coincides with aperture 27 in part 26, and hand lever may now be locked to the foot lever by the engagement of the shackle of a padlock through the coinciding apertures.

A device of our improved construction is comparatively simple, may be readily applied for use, and provides a very effective device for preventing the theft or unauthorized use of automobiles and for temporarily locking the gear shift lever in low speed position.

It will be readily understood that minor changes in the size, form and construction of the various parts of our low gear lock and theft preventing device may be made and substituted for those herein shown and described without departing from the spirit of our invention, the scope of which is set forth in the appended claim.

We claim as our invention:

In combination, a fixedly sustained bracket, a lever pivoted on the bracket and including a rack portion, a plate adapted for clamping to a gear shifting pedal, an arm formed on the plate, a tooth on said arm adapted to engage said rack portion, means for urging the lever to a position in which the rack portion disengages said tooth, a stop on the bracket for defining the urged position of said lever, and means engaging said arm and lever for locking the rack portion in engagement with said tooth.

In testimony whereof we have signed our names to this specification.

HARRY L. WARD.
HARRY E. WARD.